United States Patent
Ma et al.

(10) Patent No.: US 9,502,877 B2
(45) Date of Patent: Nov. 22, 2016

(54) INLET FUNNEL FOR CABLE TERMINAL

(71) Applicant: 3M INNOVATIVE PROPERTIES COMPANY, St. Paul, MN (US)

(72) Inventors: Qingqiang Ma, Shanghai (CN); Huawei Liu, Shanghai (CN); Gaofei Guo, Shanghai (CN); Zhigang Xu, Shanghai (CN); Jinquan Yang, Shanghai (CN); Zheng Huang, Shanghai (CN); Jiangjiang Ma, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 21 days.

(21) Appl. No.: 14/410,752

(22) PCT Filed: Mar. 6, 2013

(86) PCT No.: PCT/US2013/029330
§ 371 (c)(1),
(2) Date: Dec. 23, 2014

(87) PCT Pub. No.: WO2014/003833
PCT Pub. Date: Jan. 3, 2014

(65) Prior Publication Data
US 2015/0340853 A1    Nov. 26, 2015

(30) Foreign Application Priority Data
Jun. 26, 2012  (CN) ...................... 2012 2 0304038 U

(51) Int. Cl.
*H02G 15/04* (2006.01)
*H02G 15/00* (2006.01)
*H02G 15/02* (2006.01)

(52) U.S. Cl.
CPC .............. *H02G 15/00* (2013.01); *H02G 15/02* (2013.01)

(58) Field of Classification Search
CPC .... H02G 15/00; H02G 15/02; H02G 15/007; H02G 15/103; H02G 15/04; H01R 11/00; H01R 4/00; H01R 4/62; H01R 4/20; H01R 4/206

USPC ......... 174/135, 68.1, 68.3, 72 A, 73.1, 74 R, 174/70 C; 248/49, 68.1, 74.1, 74.2
See application file for complete search history.

(56) References Cited

U.S. PATENT DOCUMENTS 5,432,299 A * 7/1995 Ochi ...................... H01R 4/20
                                                                174/138 F
6,074,229 A    6/2000 Johansson
(Continued)

FOREIGN PATENT DOCUMENTS

DE    4428964    2/1996
EP    1359642    1/2003
(Continued)

OTHER PUBLICATIONS

International Search Report for PCT International Application No. PCT/US2013/029330 mailed on Jan. 16, 2014, 3 pages.

*Primary Examiner* — Angel R Estrada
(74) *Attorney, Agent, or Firm* — Gregg H. Rosenblatt

(57) ABSTRACT

The present invention provides an inlet funnel (100) for cable terminal, which comprises a funnel body part (10) and a fixation part (20). The funnel body part (10) has one end with a smaller opening and the other end with a larger opening, said funnel body (10) having a gradually increasing diameter (D) from said one end with the smaller opening to said other end with the larger opening, and the funnel body (10) is suitably to be installed over an electrical cable (C). The fixation part (20) is provided at said other end with the larger opening of said funnel body part (10) and adapted for the attachment of said inlet funnel (100). The inlet funnel (100) further comprises a pretreated mounting part (30) extending from said one end side with the smaller opening towards said the other end side with the larger opening. Accordingly, the inlet funnel for cable terminal according to the present invention may reduce workload, save time, and simplify the mounting process.

11 Claims, 4 Drawing Sheets

(56) References Cited

U.S. PATENT DOCUMENTS

| | | |
|---|---|---|
| 6,773,295 B2 | 8/2004 | Lindemann |
| 7,364,454 B2 * | 4/2008 | Brus .................. H02G 15/103 174/84 R |
| 7,786,383 B2 * | 8/2010 | Gumley ................ H01R 4/206 174/84 C |
| 8,519,267 B2 * | 8/2013 | Peters et al. ............ H01R 4/62 174/122 C |
| 2006/0191907 A1 | 8/2006 | Henley |

FOREIGN PATENT DOCUMENTS

| | | |
|---|---|---|
| JP | 10-174266 | 6/1998 |
| WO | WO 2014-003833 | 1/2014 |

* cited by examiner

INLET FUNNEL FOR CABLE TERMINAL

BACKGROUND

1. Field

The present invention relates to the technical field of electric cable accessories, and in particular, to an inlet funnel for cable terminal.

2. Description of the Related Art

FIG. 1 shows a typical inlet funnel for high-voltage electric cable terminals in the market. A copper inlet funnel is a necessary component for accessories of 110 KV electric cable terminal (for example, GIS terminal or outdoor terminal). Specifically, referring to FIGS. 1, 1a, and 1b, the conventional inlet funnel mainly comprises a conical main portion 1 and a trumpeted mounting portion 2, wherein an annular margin 3 is formed along exterior rim of the trumpeted mounting portion 2 and is provided with a plurality of mounting apertures 4 adapted for mounting of the funnel.

Before an installation operation, the operator needs to cut out the conical main portion 1 in the field by a specific tool in accordance with the sizes of the outer diameter of the electric cables to be mounted, to alter the size of the opening of the conical main portion 1 such that the opening of the inlet funnel completely matches with the cable metal sheath diameter during the installation operation. Then, to fixedly attach the inlet funnel to the electric cable terminal on a surface by bolting the mounting holes 4.

That is, at present, for a field installation operation, the operator not only requires a specific tool, but also needs to cut out the conical main portion 1 in the field as required by the specific tool to match the opening of the inlet funnel with the cable metal sheath having a certain size. All of these increase the amount of work and installation time in the field. Moreover, in order to ensure complete conjunction between the inlet and the cable metal sheath around the electric cable terminal, a relative accurate diameter of the inlet funnel should be obtained. Accordingly, there are some specific demands on the cutting operation which result in some difficulty during the installation. What's more, additional materials are needed during welding with the metal sheath due to the irregular shape of the cutting funnel. In addition, the specific tool may injure the operator during the installation.

Therefore, there is a demand in the market to develop a novel inlet funnel which may overcome the above mentioned disadvantages.

SUMMARY OF THE INVENTION

At least one embodiment of the present invention has been made to overcome or alleviate at least one aspect of the above mentioned disadvantages existing in the conventional technical solutions.

Accordingly, it is an object of at least one embodiment of the present invention to provide an inlet funnel for cable terminal, which may reduce workload, save time, and simplify the mounting process.

Accordingly, it is another object of at least one embodiment of the present invention to provide an inlet funnel for cable terminal, which may be mounted conveniently onto cable terminals of various diameters.

Accordingly, it is still another object of at least one embodiment of the present invention to provide an inlet funnel for cable terminal, which enables reduced material cost.

According at least one embodiment of the present invention, there is provided an inlet funnel for cable terminals, comprising:

a funnel body part comprising one end with a smaller opening and the other end with a larger opening, the funnel body having a gradually incremental diameter from the one end with the smaller opening to the other end with the larger opening, and, the funnel body being suitable to be installed over an electric cable; and a fixation part provided at the other end with the larger opening of the funnel body part and adapted for the fixation of the inlet funnel;

the inlet funnel further comprising:

a pretreated mounting part extending from the one end side with the smaller opening towards the other end side with the larger opening.

Preferably, the funnel body part has a cylindrical surface, and the pretreated mounting part comprises a plurality of lacerable units formed on the cylindrical surface.

Preferably, each of the plurality of lacerable units is presented in a linear configuration extending from the one end side with the smaller opening towards the other end side with the larger opening.

According to one preferred embodiment of the present invention, the plurality of lacerable units are symmetrically distributed around the cylindrical surface along a circumferential direction thereof.

Preferably, there are at least four lacerable units being distributed around the cylindrical surface along a circumferential direction thereof.

Preferably, the pretreated mounting part comprises lacerable sub-units defined by (1) separation lines, formed by series of lacerable apertures, that define the lacerable units and (2) circumferential marks, which may be lines, notches, or score lines extending around the circumference of the pretreated mounting part perpendicular to the extension direction of the lacerable units.

Preferably, the pretreated mounting part further comprises sectional dimension marks provided along an extension direction of the plurality of the lacerable units and adjacent the circumferential marks adapted for indicating the dimensions of each cross-sectional area at each circumferential mark of the funnel body part.

According to some preferred embodiments of the present invention, a distance between each two lacerable apertures of the lacerable units is designed to vary in accordance with change of aperture size of side lacerable apertures, in order to facilitate laceration of the lacerable units.

According to one preferred embodiment of the present invention, the lacerable aperture in the lacerable units is embodied to be a round aperture with a diameter ranged from 0.5 mm-5 mm. In other preferred embodiments, the lacerable aperture in the lacerable units is to be an oblong aperture with a minor diameter ranged from 0.5 mm-5 mm and a major diameter ranged from 1.0 mm-50 mm. Or, the lacerable aperture in the lacerable units is to be a square aperture with a side length ranged from 1.0 mm-15.0 mm. Or, the lacerable aperture in the lacerable units is embodied to be a hexagonal aperture with a side length ranged from 1.0 mm-15.0 mm.

According to some preferred embodiments of the present invention, the fixation part comprises a circular edge, provided at the other end side with the larger opening of the funnel body part, extending along a circumferential direction of the cylindrical surface; and a plurality of mounting holes formed at the circular edge.

As is apparent from the above, the present invention at least has the following advantages: by providing a pretreated mounting part with lacerable units based on the conventional inlet funnel, the inlet funnel for cable terminals according to the present invention may be easily modified to be mounted on cable terminals of various diameters. Accordingly, the inlet funnel for cable terminal according to the present invention may reduce workload, save time, and simplify the mounting process. Further, the inlet funnel for cable terminals according to the present invention may be mounted conveniently onto cable terminals of various diameters. Furthermore, the inlet funnel for cable terminal according to the present invention enables reduced material cost.

The scope of the present invention will in no way be limited to the simple schematic views of the drawings, the number of constituting components, the materials thereof, the shapes thereof, the relative arrangement thereof, etc., and are disclosed simply as an example of an embodiment.

BRIEF DESCRIPTION OF THE DRAWINGS

The foregoing and/or other aspects and advantages of the invention will become apparent and more readily appreciated from the following description of the embodiments, taken in conjunction with the accompanying drawings of which.

DETAILED DESCRIPTION

Figure 1:
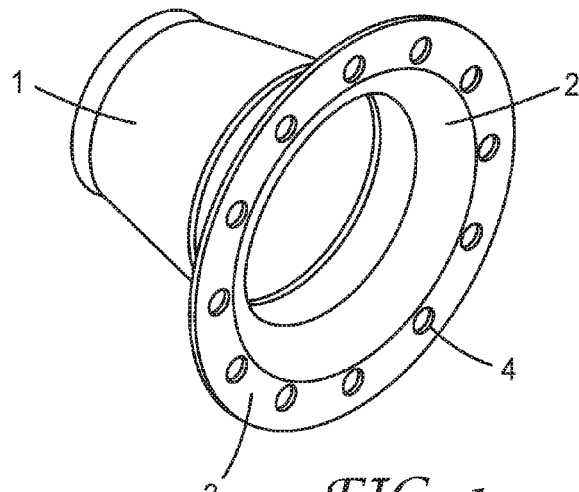
FIG. 1 shows a conventional inlet funnel for cable terminal adopted in the prior art.
Figure 1A:
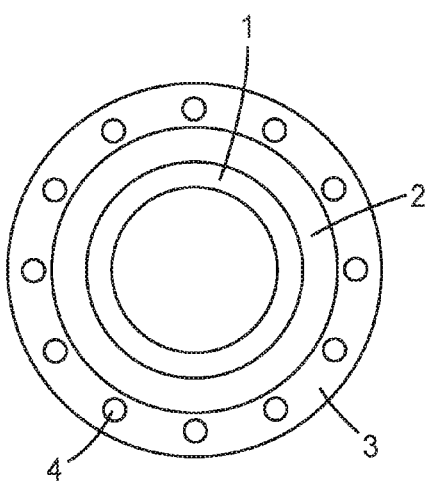
FIG. 1a is a schematic end view of FIG. 1.
Figure 1B:
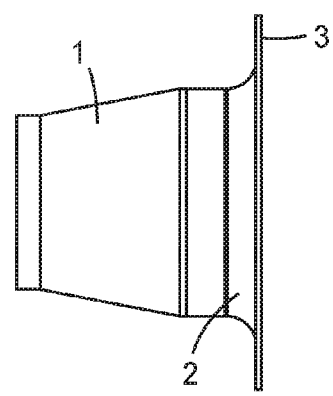
FIG. 1b is a schematic side view of FIG. 1.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
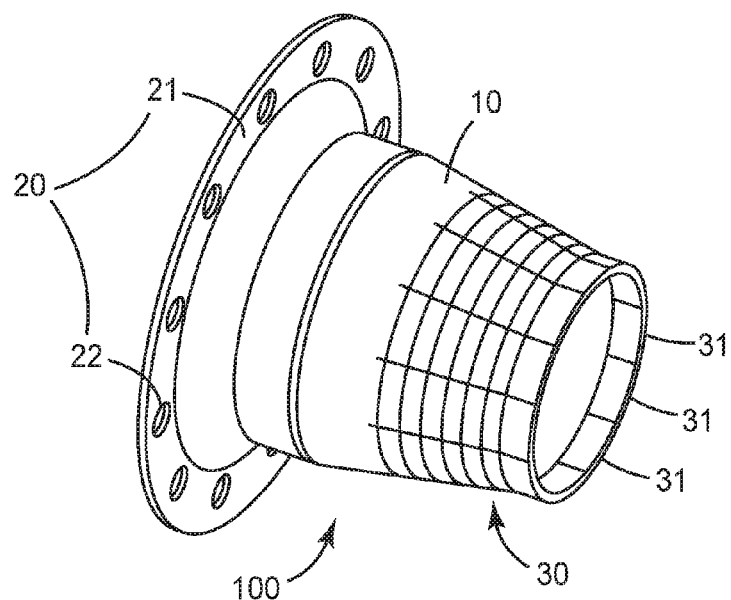
FIG. 2 is a perspective view of an inlet funnel for cable terminals according to one preferred embodiment of the present invention.

Referring to FIGS. 2-6, embodiments of the present invention provide an inlet funnel 100 for cable terminals. As shown in FIG. 2, the inlet funnel 100 comprises a funnel body part 10 and a fixation part 20. The funnel body part 10 comprises one end with a smaller opening and the other end with a larger opening, the funnel body 10 having a gradually incrementally increasing diameter from the one end with the smaller opening to the other end with the larger opening, and, the funnel body 10 being suitable for placement over an electric cable C (see FIG. 6). The fixation part 20 is provided at the other end with the larger opening of the funnel body part 10 and adapted for the fixation of the inlet funnel 100 to a surface. According to one preferred embodiment of the present invention, the inlet funnel 100 further comprises a pretreated mounting part 30 extending along the funnel body 10 from the one end side with the smaller opening towards the other end side with the larger opening. Embodiments of the present invention may include other detailed structures and components of the inlet funnel 100 for cable terminals, for example, a trumpet body of the inlet funnel extending from the funnel body part 10 to the fixation part 20, may be omitted as they are not required for the inventive concept of the present invention. Those skilled in the art may refer to relevant disclosure in the prior art if necessary.

Figure 3:
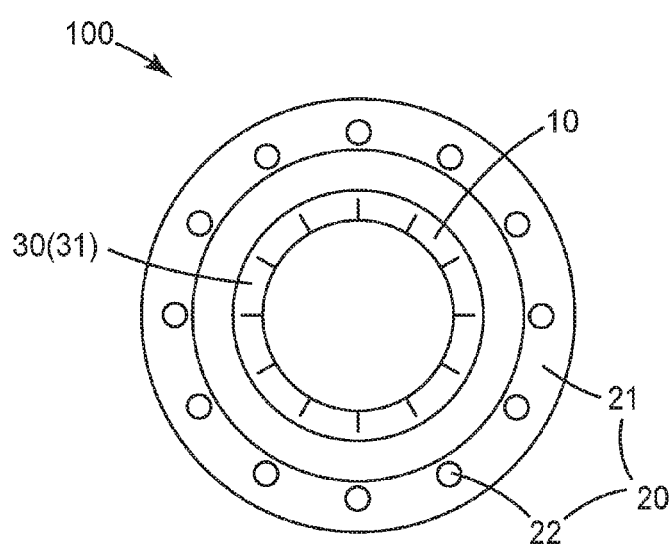
FIG. 3 is a schematic end view of an inlet funnel for cable terminal according to one preferred embodiment of the present invention.
Figure 4:
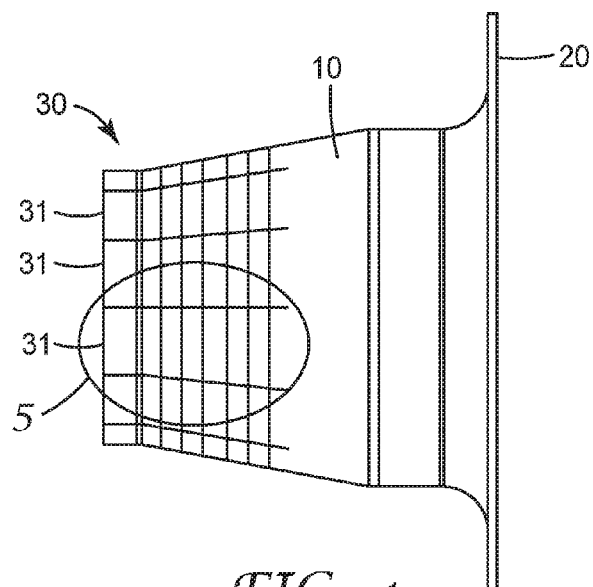
FIG. 4 is a schematic side view of the inlet funnel for cable terminal according to one preferred embodiment of the present invention.

According to one preferred embodiment of the present invention, referring to FIGS. 2-4, the funnel body part 10 has a cylindrical surface. Preferably, the funnel body part 10 may be made from metal (such as lead) sheets. According to some embodiments of the present invention, the pretreated mounting part 30 comprises a plurality of lacerable units 31 formed on the cylindrical surface of the funnel body part 10. According to this preferred embodiment, each of the plurality of lacerable units 31 is presented in a linear configuration extending along the funnel body part 10 from the one end side with the smaller opening towards the other end side with the larger opening. Specifically, the plurality of lacerable units 31 are symmetrically distributed around the cylindrical surface of the funnel body part 10 along a circumferential direction thereof. Of course, in other embodiments, the plurality of lacerable units 31 may be asymmetrically distributed around the cylindrical surface of the funnel body part 10 along a circumferential direction thereof.

According to some embodiments of the present invention, there are at least four lacerable units 31 being distributed around the cylindrical surface of the funnel body part 10 along a circumferential direction thereof. According to a preferred embodiment, twelve lacerable units 31 are symmetrically distributed around the cylindrical surface of the funnel body part 10 along a circumferential direction thereof. Referring to FIG. 2, each of these twelve lacerable units 31 is formed by linearly extending the funnel body part 10 from the one end side with the smaller opening towards the other end side with the larger opening. As learned from the shown preferred embodiment, the circumferential dimension of the funnel body part 10 transitions step-wise from the one end side with the smaller opening towards the other end side with the larger opening; and, each of these lacerable units 31 extends linearly and along the funnel body part 10 from the one end side with the smaller opening towards the other end side with the larger opening. Of course, in other embodiments, the circumferential dimension of the funnel body part 10 may transition smoothly from the one end side with the smaller opening towards the other end side with the larger opening of the funnel body part 10. Accordingly, each of these lacerable units 31 extends linearly and smoothly along the funnel body part 10 from the one end side with the smaller opening towards the other end side with the larger opening.

According to some preferred embodiments of the present invention, a distance between each two lacerable apertures 310 of the lacerable units 31 is designed to vary in accordance with change of aperture size of lacerable apertures 310, in order to facilitate laceration of the lacerable units 31. Particularly, a lacerate force for laceration of the lacerable units 31 should be ensured that the operator may implement laceration of the lacerable units easily during the laceration operation while avoiding self-laceration. Such assurance should be carried out by several parameters adopted in the practice, for example, size of the inlet funnel 100, shape and diameter of the lacerable aperture 310, pitches between these lacerable apertures 310, and so on. There are no detailed descriptions on these parameters, however, shapes and diameters of the preferred lacerable aperture 310 are given below, in order for easy reference.

Figure 5:
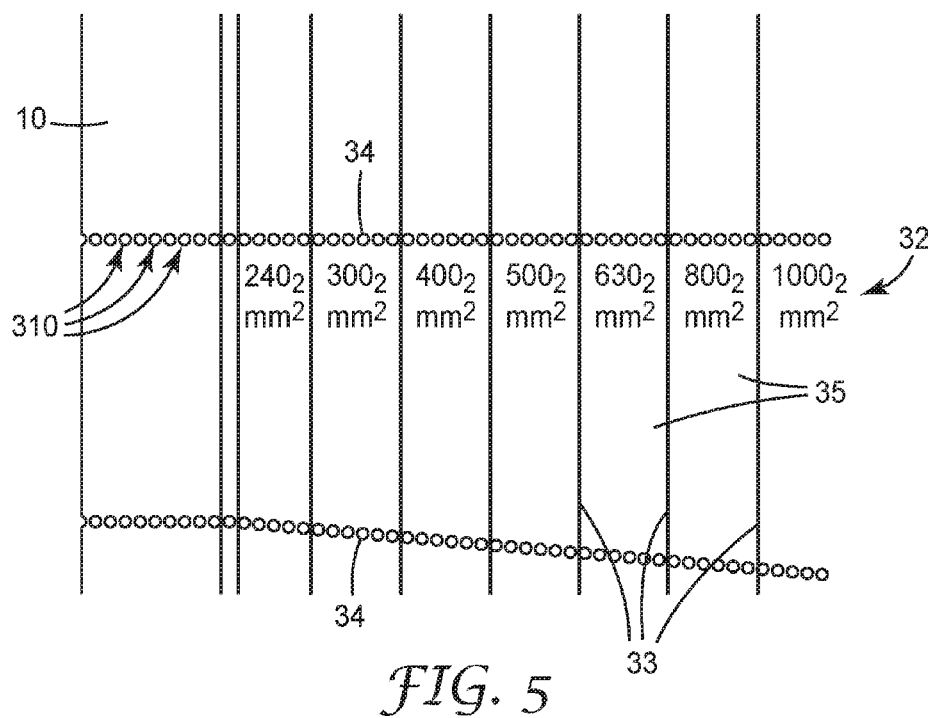
FIG. 5 is a partially enlarged schematic view of FIG. 4.
Figure 6:
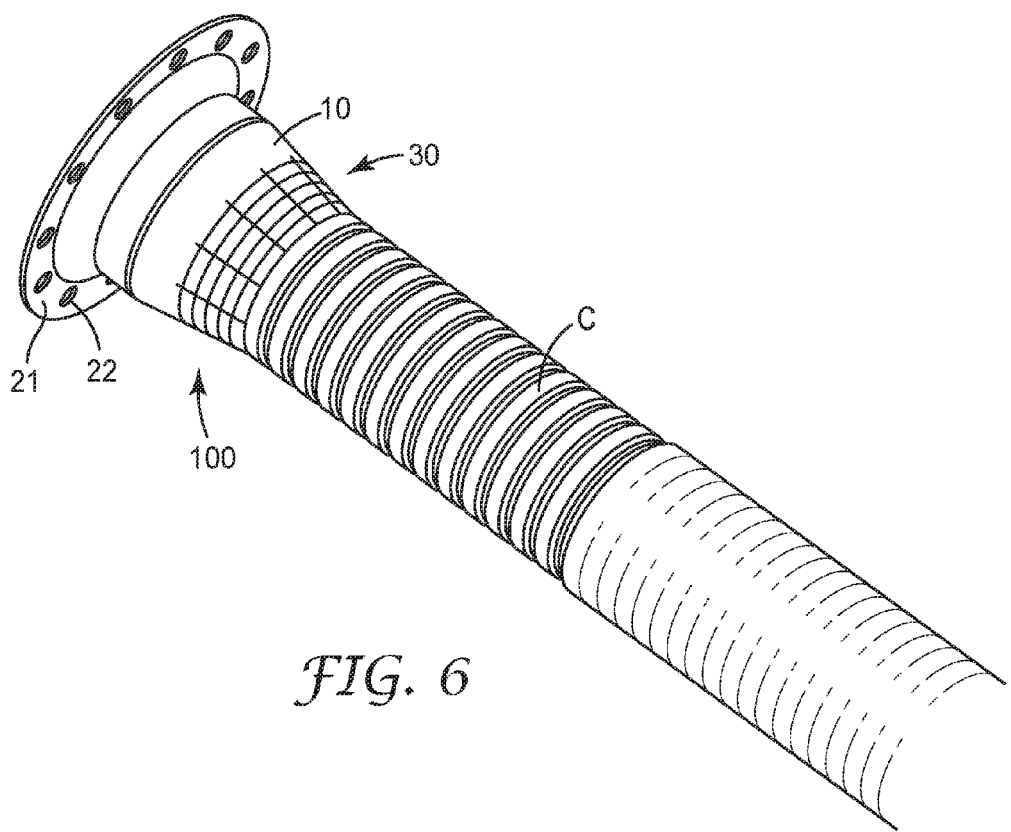
FIG. 6 is a schematic view of the inlet funnel for cable terminal according to one preferred embodiment of the present invention attached to an electric cable.

According to the preferred embodiment of the present invention shown in the Figures, referring to FIG. 5, the lacerable apertures 310 in the lacerable units 31 are embodied to be a round aperture with a diameter ranged from 0.5 mm-5 mm. Of course, shapes of the lacerable apertures 310 and the pitches between these lacerable apertures 310 may vary in other embodiments of the present invention. For example, in an embodiment in which the lacerable apertures 310 in the lacerable units 31 is embodied to be an oblong aperture, the lacerable apertures 310 have a minor diameter ranged from 0.5 mm-5 mm and a major diameter ranged from 1.0 mm-50 mm. Or, in an embodiment in which the lacerable apertures 310 in the lacerable units 31 are embodied to be square apertures, the lacerable apertures 310 has a side length ranged from 1.0 mm-15.0 mm. Or, in an embodiment in which the lacerable apertures 310 in the lacerable units 31 are embodied to be hexagonal apertures, the lacerable apertures 310 have a side length ranged from 1.0 mm-15.0 mm. The lacerable apertures form separation lines 34.

In addition, according to a preferred embodiment of the present invention, in order for facilitating prompt and accurate laceration of the lacerable units implement by the operator such that the inlet funnel 100 suits the cable terminals of various diameters, the pretreated mounting part 30 further comprises circumferential marks 33, which may be lines drawn on pretreated mounting part 30, or notches, score lines, or the like formed in pretreated mounting part 30, and extending around the circumference of the pretreated mounting part 30 perpendicular to the extension direction of the lacerable units 31. The separation lines 34 and circumferential marks 33 together define lacerable sub-units 35.

Preferably, the pretreated mounting part further comprises sectional dimension marks 32 provided along an extension direction of the plurality of the lacerable units 31, and adjacent circumferential marks 33, adapted for indicating the dimensions of each cross-sectional area at each circumferential mark 33 of the funnel body part 10. Each sectional dimension mark 32 indicates the cross-sectional dimension at the adjacent circumferential mark 33. Accordingly, the operator may implement prompt and accurate lacerations of the lacerable apertures 310 of the lacerable units 31 in accordance with the relevant sectional dimension marks 32, such that the inlet funnel 100 satisfies the demands of various cable terminals of particular diameter. For example, an operator can use a saw, knife, or other means to separate adjacent lacerable units 31 along separation lines 34 down to the desired circumferential mark 33, which circumferential mark 33 has the same cross-sectional area as the cable that will be fed through, and installed using, the inlet funnel 100. The lacerable sub-units 35 adjacent the portion of lacerable units 31 that have been separated along separation lines 34 can then be cut or sawed off or, if the circumferential marks 33 are notches or score lines, may be snapped off, at the chosen circumferential mark 33, giving an accurate and smooth cross-sectional dimension.

Of course, according to some preferred embodiments of the present invention, in this inlet funnel 100, the fixation part 20 comprises a circular edge 21, provided at the other end side with the larger opening of the funnel body part 10, extending along a circumferential direction of the cylindrical surface; and a plurality of mounting holes 22 formed at the circular edge 21. Accordingly, the inlet funnel 100 may be attached by the fixation part 20 onto the surface where the electric cable is located, for the mounting of the inlet funnel 100.

Operation of the inlet funnel 100 according to the preferred embodiment of the present invention is described as follows. Firstly, in accordance with the high-voltage cable terminal to be fitted which has a certain diameter, the operator lacerates lacerable apertures 310 of the lacerable units 31 of the pretreated mounting part 30, by a simple tool (e.g., a pliers), till reaching the particular sectional dimension marks 32 which satisfies the certain sectional dimension requirement. Then, to slide this inlet funnel 100 onto the high-voltage cable terminal and to closely attach the funnel body part 10 of the inlet funnel 100 onto the outer sheath of the electric cable C by strengthening the junction between the funnel body part 10 of the inlet funnel 100 and the outer sheath of the electric cable C by means of tapping, e.g., by a hammer. Next, to mount the inlet funnel 100 to the surface where the electric cable is located by passing bolts through the mounting holes 22 in the fixation part 20. At last, to finish the installation operation by performing the remaining processes such as splicing.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An inlet funnel for cable terminal, comprising:
   a funnel body part comprising one end with a smaller opening and the other end with a larger opening, said funnel body having a gradually incremental diameter from said one end with the smaller opening and said the other end with the larger opening, and, said funnel body being suitably to be wrapped over an electric cable; and
   a fixation part provided at said the other end with the larger opening of said funnel body part and adapted for the fixation of said inlet funnel;
   wherein, said inlet funnel further comprises:
   a pretreated mounting part extending from said one end side with the smaller opening towards said the other end side with the larger opening; and
   wherein, said funnel body part has a cylindrical surface, and said pretreated mounting part comprises a plurality of lacerable units formed on said cylindrical surface.

2. The inlet funnel according to claim 1, wherein, each of the plurality of lacerable units is presented in a linear configuration by extending from said one end side with the smaller opening towards said the other end side with the larger opening.

3. The inlet funnel according to claim 1, wherein, the plurality of lacerable units are symmetrically distributed around said cylindrical surface along a circumferential direction thereof.

4. The inlet funnel according to claim 1, wherein,
   there are at least four lacerable units being distributed around said cylindrical surface along a circumferential direction thereof.

5. The inlet funnel according to claim 2, wherein,
   said pretreated mounting part comprises sectional dimension marks provided along an extension direction of the plurality of said lacerable units and adjacent circumferential marks adapted for indicating the dimensions of each cross-sectional area at each circumferential mark of said funnel body part.

6. The inlet funnel according to claim 1, wherein, a distance between each two lacerable apertures of said lacerable units is designed to vary in accordance with change of aperture size of side lacerable apertures, in order to facilitate laceration of said lacerable units.

7. The inlet funnel according to claim 1, wherein, the lacerable aperture in said lacerable units is to be a round aperture with a diameter ranged from 0.5 mm-5 mm.

8. The inlet funnel according to claim 1, wherein, the lacerable aperture in said lacerable units is to be an oblong aperture with a minor diameter ranged from 0.5 mm-5 mm and a major diameter ranged from 1.0 mm-50 mm.

9. The inlet funnel according to claim 1, wherein, the lacerable aperture in said lacerable units is to be a square aperture with a side length ranged from 1.0 mm-15.0 mm.

10. The inlet funnel according to claim 1, wherein, the lacerable aperture in said lacerable units is to be a hexagonal aperture with a side length ranged from 1.0 mm-15.0 mm.

11. An inlet funnel for cable terminal, comprising:

a funnel body part comprising one end with a smaller opening and the other end with a larger opening, said funnel body having a gradually incremental diameter from said one end with the smaller opening and said the other end with the larger opening, and, said funnel body being suitably to be wrapped over an electric cable; and a fixation part provided at said the other end with the larger opening of said funnel body part and adapted for the fixation of said inlet funnel;

wherein, said inlet funnel further comprises:

a pretreated mounting part extending from said one end side with the smaller opening towards said the other end side with the larger opening; and wherein, said fixation part comprises a circular edge, provided at said the other end side with the larger opening of said funnel body part, extending along a circumferential direction of said cylindrical surface; and a plurality of mounting holes formed at said circular edge.

\* \* \* \* \*